(No Model.) 3 Sheets—Sheet 1.
J. RAPIEFF.
INDICATOR FOR RANGE FINDERS.
No. 441,975. Patented Dec. 2, 1890.
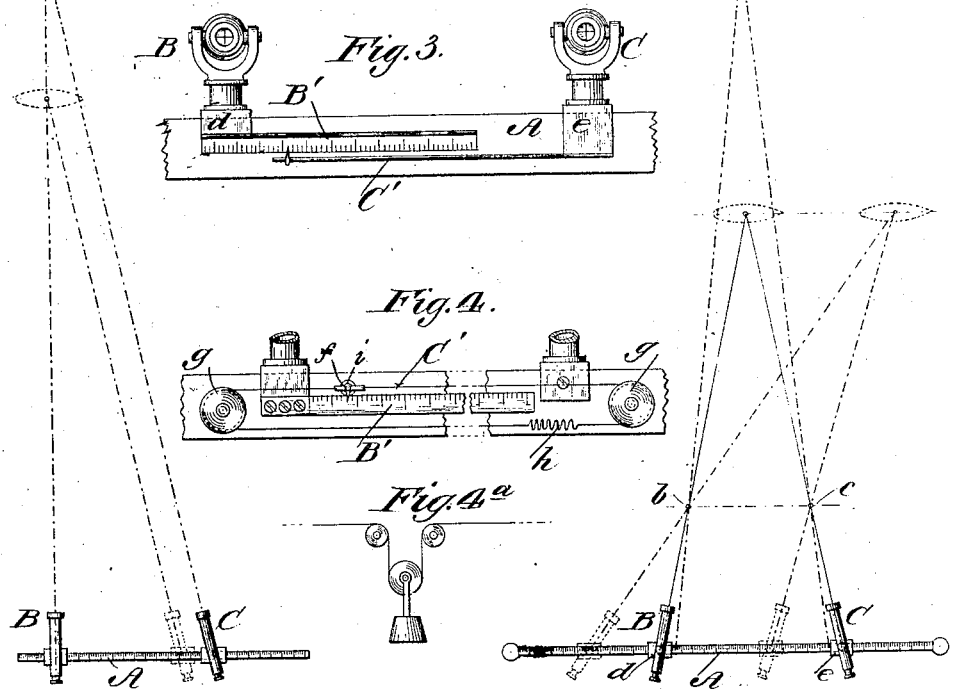
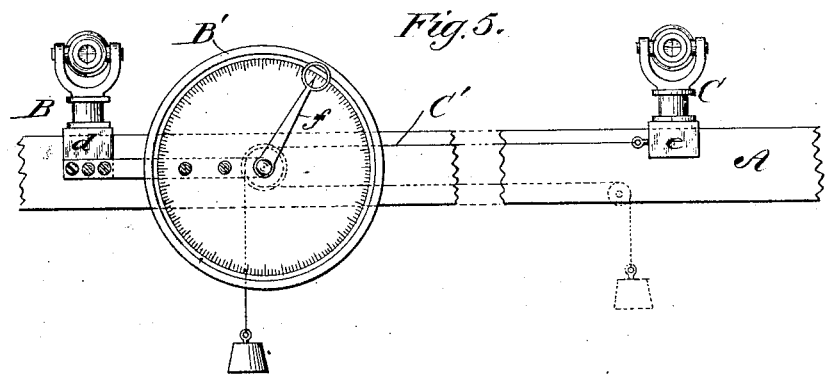
WITNESSES:
INVENTOR
ATTORNEY (No Model.)    3 Sheets—Sheet 2.

J. RAPIEFF.
INDICATOR FOR RANGE FINDERS.

No. 441,975.    Patented Dec. 2, 1890.

WITNESSES:    INVENTOR
H. F. Parker.    John Rapieff
Chas. Hanimann.    BY
    Chas. W. Forbes
    ATTORNEY (No Model.) 3 Sheets—Sheet 3.
J. RAPIEFF.
INDICATOR FOR RANGE FINDERS.
No. 441,975. Patented Dec. 2, 1890.
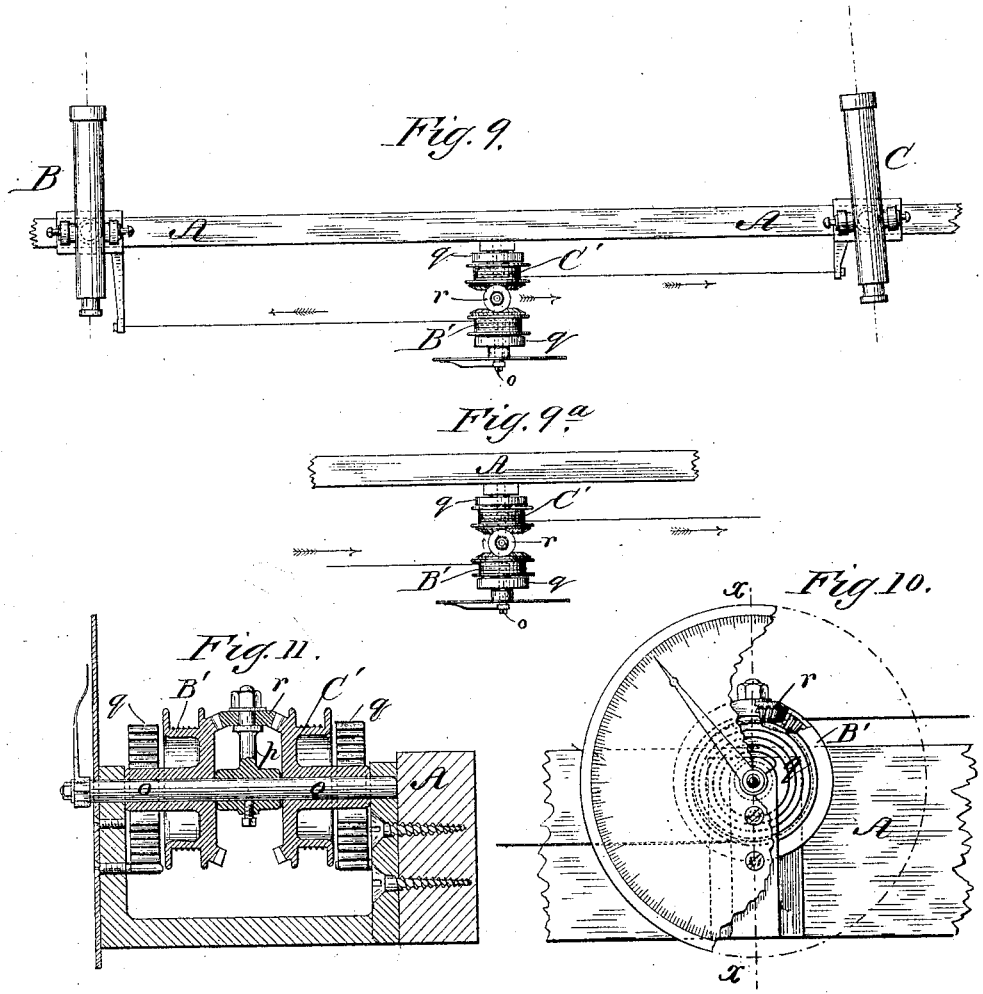
WITNESSES:
H. F. Parker
Chas. Hanimann
INVENTOR
John Rapieff
BY
Chas. W. Forbes
ATTORNEY

UNITED STATES PATENT OFFICE.

JOHN RAPIEFF, OF NEW YORK, N. Y.

INDICATOR FOR RANGE-FINDERS.

SPECIFICATION forming part of Letters Patent No. 441,975, dated December 2, 1890.

Application filed March 10, 1890. Serial No. 343,363. (No model.)

*To all whom it may concern:*

Be it known that I, JOHN RAPIEFF, a subject of the Czar of Russia, residing in the United States, at the city, county, and State of New York, have invented certain new and useful Improvements in Indicators for Range-Finding Instruments, of which the following is a specification.

My invention relates to range-finding instruments in which the telescopes or alidades are movable with relation to one another and also with relation to the frame which supports them, the range of distant objects being measured by a known ratio of the distance between the instruments thereto.

The invention consists in indicating apparatus controlled by the variation of the distance between the instruments irrespective of their position upon the frame.

Figure 6:
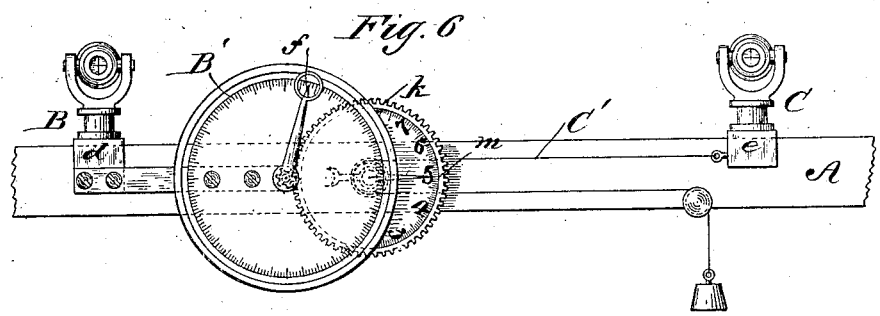
Figure 7:
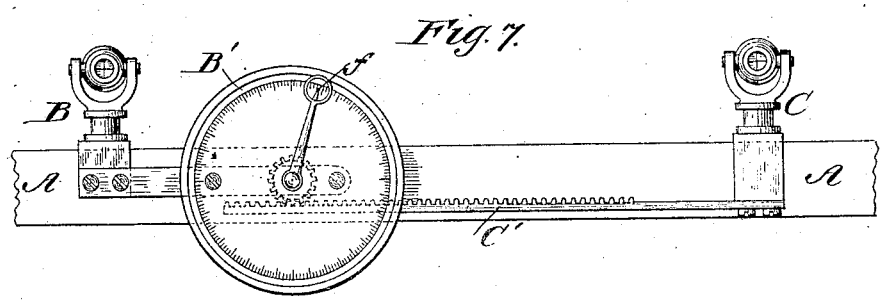
Figure 8:
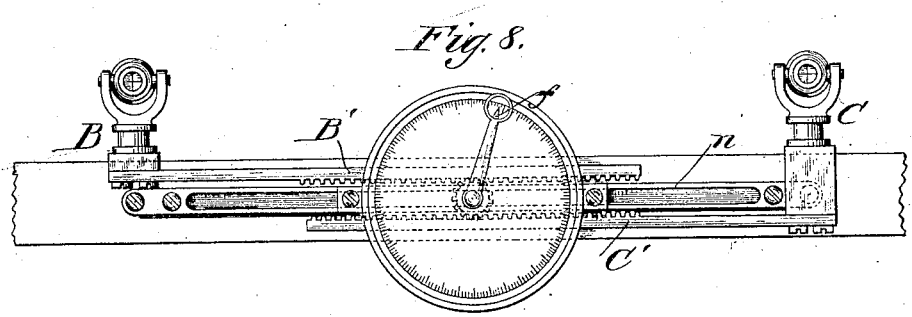

Referring to the drawings, Figure 1 is a diagram illustrating the character of the instrument to which the invention is applicable; Fig. 2, a diagram of a different construction of instrument to which the invention is also applicable; Fig. 3, a front view of an elementary form of the device. Fig. 4 illustrates a construction in which the indicator is carried on an endless cord. Fig. 4ª is a detail view relating to Fig. 4. Fig. 5 illustrates a construction in which the indicator-cord is retracted by a weight (or equivalent), and a dial carried by one of the instruments is employed to amplify the readings. Fig. 6 illustrates a construction of the dial for further amplifying the readings. Fig. 7 illustrates the use of a rack and pinion instead of the cord for operating the dial carried by one of the instruments. Fig. 8 illustrates a construction in which the dial is supported independently of either of the instruments, but is operated by both. Fig. 9 illustrates a construction in which the dial is supported upon the frame and is operated by both instruments, according to the conditions common to the preceding forms. Fig. 9ª is a detail view corresponding with Fig. 9, indicating a different movement of the same parts; Fig. 10, an enlarged front elevation, partly in section, of the dial in Fig. 9; and Fig. 11, a section of Fig. 10 on the line *x x*.

A is the bar or frame upon which the telescopes (or alidades) B C are slid to vary the distance between them or to change their position with reference to a stationary point or points, such as indicated at *b c* in Fig. 1. The sighting-points *b c*, which pertain to the respective telescopes B C, are fixed with relation to the frame A on the principle of a plane table, and the telescopes are each swiveled upon their slides *d e*. When the range of an object—such as D—is to be determined, the axis of the telescopes and their respective sighting-points *b* or *c* are brought into common lines with the object D, whatever the position or distance of the same may be, as indicated. The distance is thus determinable by measuring the actual distance apart of the instruments irrespective of their position upon the slide A. For this purpose the devices herein illustrated consist of an indicator, one movable part B' of which is connected to one instrument, the other movable part C' of which is connected to the other instrument, said parts rendering the index *f* operative when the distance between the instruments is varied, but inoperative when both instruments are moved equally in a common direction.

In Fig. 3, B' consists of a lineal scale connected to the instrument B, and C' of an index connected directly to the instrument C.

In Fig. 4, B' consists of a lineal scale, as before, and C' of a cord fastened to the instrument C, passing over sheaves *g g*, the said cord bearing an index *f*, traveling by means of an anti-friction roller *i* on the edge of the scale-bar. The cord C' is kept at a proper tension by means of a spring *h*, or by means of a weighted take-up device, consisting of sheaves, as in Fig. 4ª.

In Fig. 5, B' consists of a circular scale or dial connected to the instrument B, and C' of a weighted cord connected to the instrument C and a rotary index *f*, having a sheave upon its shaft, with which the cord engages. The cord may be provided with knots at intervals or a series of balls and the sheave with corresponding recesses or notches to insure positive engagement and relation of the index to the cord.

In Fig. 6 the construction is similar to Fig. 5, with the addition of a spur-wheel *k* and pinion on the index-shaft to multiply motion, the ratio being, for instance, 10 to 1. The spur-wheel $k$ bears a scale, and the index $m$ is stationary, being always in sight. The dial $k$ may thus indicate yard-units in thousands, and the index $f$ indicates the same in hundreds.

In Fig. 7, B' consists of a dial, and C' of a rack operating the index $f$ through the pinion on its shaft, operating similarly in effect to Fig. 5.

In Fig. 8, both B' and C' consist of racks connected to the respective instruments and engaging with the index-pinion, while the dial is capable of sliding on the ways $n$ when the instruments are moved in a common direction, or when movement is imparted to one instrument alone.

In Figs. 9 to 11, inclusive, B' and C' both consist of drums connected by cords to the respective instruments. The drums are loose upon a common index-shaft $o$, the bearings of which are fixed to the frame A, as also the dial. The drums are provided with beveled gears facing a common transmitting-gear $r$, which revolves upon an arm $p$, fixed to the index-shaft. There are coiled springs $q$, which take up the cords by causing the drums to rotate when the instruments are moved toward the indicator. By the direction of winding of the respective cords, as seen in Fig. 10, the approaching or parting movement of the instruments B C, as indicated by arrows in Fig. 9, will revolve both drums in a common direction, carrying the transmitting-gear, the arm $p$, and the index with them in one direction or another with reference to a given zero-point on the dial, while the equal movement of said instruments in a common direction, as indicated by arrows in Fig. 9$^a$, preserving the distance between the instruments, will rotate the drums oppositely, simply revolving the transmitting-gear without moving the arm $p$ or the index.

I claim as my invention—

1. The combination, in a range-finding instrument, of two telescopes or alidades, both movable at variable distances apart, and an indicating device consisting of two movable adjacent parts connected, respectively, to said instruments, and an indicating scale or dial common to both said movable parts, upon which the variations of distance between the instruments are indicated irrespective of the position of such instruments with reference to a fixed point.

2. The combination, in a range-finding instrument, of two telescopes or alidades, both movable at variable distances apart, and an indicating device consisting of a dial, a rotary index, two drums loose upon the shaft of the index bearing bevel-gears facing one another, a transmitting-gear between said bevel-gears upon an arm fixed to said shaft, cords connecting the drums with the said telescopes or alidades, and retracting-springs (or equivalent) connected to the drums, said parts operative in the relation described.

JOHN RAPIEFF.

Witnesses:
CHAS. W. FORBES,
CHAS. HANIMANN.